Dec. 7, 1943.   R. G. UHLIG   2,336,378
COOLING PULVERULENT MATERIALS
Filed Aug. 31, 1940   2 Sheets-Sheet 1

INVENTOR
RICHARD G. UHLIG
ATTORNEYS

Dec. 7, 1943.    R. G. UHLIG    2,336,378
COOLING PULVERULENT MATERIALS
Filed Aug. 31, 1940    2 Sheets-Sheet 2

INVENTOR
RICHARD G. UHLIG
ATTORNEYS

Patented Dec. 7, 1943

2,336,378

UNITED STATES PATENT OFFICE 2,336,378

COOLING PULVERULENT MATERIALS

Richard G. Uhlig, Ladue, Mo., assignor to Missouri Portland Cement Co., St. Louis, Mo., a corporation of Missouri Application August 31, 1940, Serial No. 354,951

4 Claims. (Cl. 34—56)

This invention relates, generally, to the manufacture of Portland cement, and particularly to a process and apparatus for cooling ground cement clinker and similar materials.

In the manufacture of Portland cement, it has frequently been found necessary to subject the product to treatments which will reduce the temperature thereof, such for example, as at the end of a grinding operation, which may be either the preliminary (coarse) or final (fine) grind. While many efforts have been made to produce a cooling apparatus which is feasible for employment in the treatment of Portland cement, the majority of such attempts have been characterized by the employment of moving parts which, due to the nature of material being treated, are subjected to excessive abrasion, and hence require frequent repair and replacement.

The present invention has for its object, generally stated, the provision of a process and apparatus for cooling cement wherein a plurality of heat exchange media may be employed, and the rate of dissipation of heat from the cement is high.

A further object of the present invention is to provide an apparatus for cooling cement in which the cooling is accomplished without moving parts.

A particular object of the present invention is to provide a process and apparatus of concurrently agitating and cooling cement by means of a current of gas, such as air.

A more specific object is to provide a process and apparatus for cooling cement or the like wherein a plurality of cooling media may be concurrently employed.

Other objects will become apparent to those skilled in the art when the following description is read in connection with the accompanying drawings, in which.

Figures 1, 4:
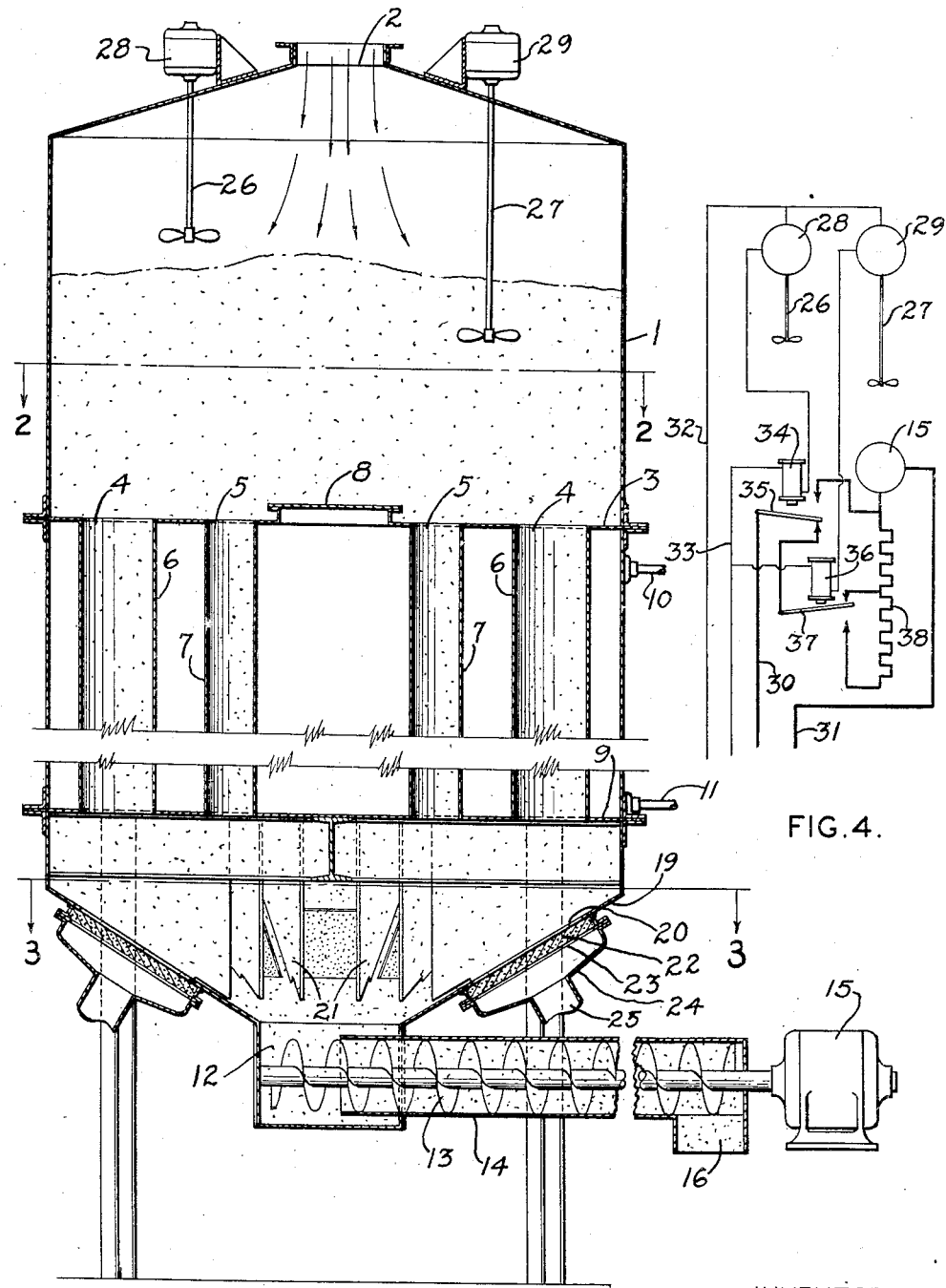
Figure 1 is a vertical sectional view of one embodiment of a cement cooler constructed in accordance with the present invention.
Figure 4 is a wiring diagram, showing one suitable arrangement of electrical parts for controlling the discharge of cement from the apparatus of Figure 1.
Figure 2:
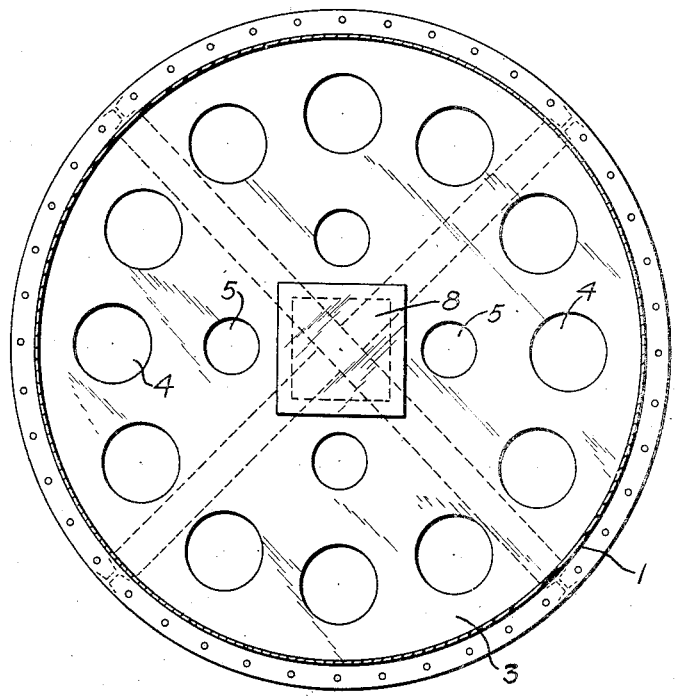
Figure 2 is a sectional view, taken along line 2—2 of Figure 1.

In accordance with the present invention, generally stated, ground cement clinker, either after final grinding or at any preliminary stage, is caused to flow as a continuous curtain across a stream of cooling gas. The present invention especially contemplates that the stream of cooling gas, such as air, be dispersed and distributed so as to present itself to the cement being cooled in the form of a multiplicity of fine streams, slightly spaced from each other, as is accomplished by the delivery of the stream of cooling gas through a foraminous member, such for example as a filter stone.

A further feature of the present invention resides in the construction and arrangement of parts so that a stream of cement is fed through a confining member, in counter-current relation to the flow of cooling gas through the confining member, and the rate of feed of the cement is so co-ordinated that the cement in the confining member presents itself to the cooling gas as a continuous curtain, extending across the confining member in a direction substantially normal to the general direction or travel of the cooling gas. In order to accomplish this result, a tube of limited cross-sectional area may be arranged with reference to a source of supply and a discharge device so that the tube is always full of cement, moving from the source toward the discharge member. By providing an inlet for the cooling gas adjacent the discharge end of the tube, the cooling gas may be forced in counter-current relation to the flow of cement through the tube or confining member. As pointed out hereinbefore, the supply of cooling gas is preferably delivered to the cement in the form of a multiplicity of dispersed small streams or jets. When the cooling gas is delivered to a confined column of cement, as just described, and the cooling gas is caused to move in counter-current relation to the travel of the cement in the confining member, substantial agitation of the cement within the confining member takes place, and the individual particles are turned over and over in the stream of cooling gas, exposing their various surfaces to the gas, and dissipating heat thereto.

The present invention further contemplates the provision of a heat-absorbing medium about the exterior of the confining members just referred to. Such heat exchanging medium may be a bath of water continuously circulating in a manner such that the water at the higher temperature is continuously removed and replaced by cooler water. This arrangement makes it desirable that the confining medium through which the column of cement moves be formed of a material having relatively good heat conductivity, such as metal, and the action of the dispersed streams of air flowing in counter current relation to the general direction of the cement within the confining member continuously agitates the confined cement, and progressively moves different particles into contact with the walls of the confining member, so that heat of the individual particles of cement is absorbed by the walls of the confining member, and delivered to the cooling medium surrounding the same.

The action of the current of cooling gas, in accordance with the present invention, necessitates co-ordination of the rate of feed of the material to the cooling device and the rate of discharge therefrom, in order that a continuous curtain of cement is maintained at all times across the confining member; and it is obvious that if such a confining member were only partially curtained, the cooling gas would travel in the open spaces and be effective to cool only the surface particles of cement; whereas when the material is maintained in the form of a continuous curtain across the flow of the stream of cooling gas, the characteristic agitation and cooling of the entire body of cement is accomplished.

Referring now to the drawings for an illustrative embodiment of the present invention, a cooler is shown in which there is provided a receiving chest and a discharge hopper interconnected by a plurality of tubular confining members, through which the cement is caused to pass downwardly from the receiving chest toward the discharge hopper. Arranged adjacent the lower ends of the tubular confining members provision is made for the admission of air or other cooling gas, under pressure, in the form of dispersed fine streams or jets, as hereinbefore described.

In the embodiment shown, a tank 1 is provided at its upper end with an orifice 2 through which cement is fed to the cooling apparatus from the grinding mills, or other suitable source. Positioned sufficiently below the top of tank 1 to provide a space sufficient to accommodate a substantial working supply of cement is a partition 3, extending crosswise of the tank 1. The partition 3 is provided with a series of openings 4, and a series of smaller openings 5, into which are respectively received tubular confining members 6 and 7. The confining members 6 and 7 are connected to partition 3, as by welding, so as to seal off the space below partition 3, and externally of confining members 6 and 7, from the space within the confining members and above the partition.

For access to the sealed-off space below partition 3, a manhole 8 may be arranged as shown.

The tubular confining members 6 and 7 are of a cross section and length such that cement may be caused to pass therethrough from the supply maintained above partition 3 at such rate that the confining members are maintained always full of cement. For example, the tubular confining members 4 and 5 may be formed respectively of standard steel 12" and 8" pipe, and be of a length on the order of twenty feet. At the lower ends of the tubular confining members 4 and 5, a partition 9 is provided, suitably connected to the interior walls of tank 1 and to the tubular confining members 4, 5, as to seal off the space above partition 9 externally of tubular members 4 and 5 from the space internally thereof, and below partition 9.

The arrangement just described provides between partition 3 and partition 9 a cellular cooler in which the material to be cooled is passed through the tubes, and a cooling bath is maintained on the exterior of the tubes. In order to provide for continuous circulation of the cooling medium in the space between partitions 3 and 9, exteriorly of the tubular confining members, an outlet 10 provided therein immediately below partition 3, and an inlet 11 may be formed in the wall of tank 1 immediately above partition 9. While but one outlet and but one inlet is shown in the drawings, it is obvious that a plurality of each may be desirable, and accordingly, to secure uniformity of cooling, such outlets are preferably arranged symmetrically about tank 1. Water or other cooling medium may then be continuously circulated through the device, the cool water entering at 11, and the warm water being discharged at 10.

The lower end of tank 1, below partition 9, is formed as a discharge hopper, arranged to receive the cement flowing downwardly through confining members 4 and 5, and is provided at its lower end with a sump 12 in which a discharge device, such as a screw conveyor 13, operates through a tunnel 14, being driven by a motor 15, or other suitable source of power, so as to move the cooled cement from sump 12 to a discharge opening 16.

Since the portion of tank 1 below partition 9 receives the cement issuing from tubes 4 and 5 and retains it until removed by the discharge device, the lower portion of the tank may be described as a receiving chest. Also, since in the embodiment shown in the drawings such receiving chest embraces the mouths of a plurality of the tubes, it may be described as a header therefor.

Figure 3:
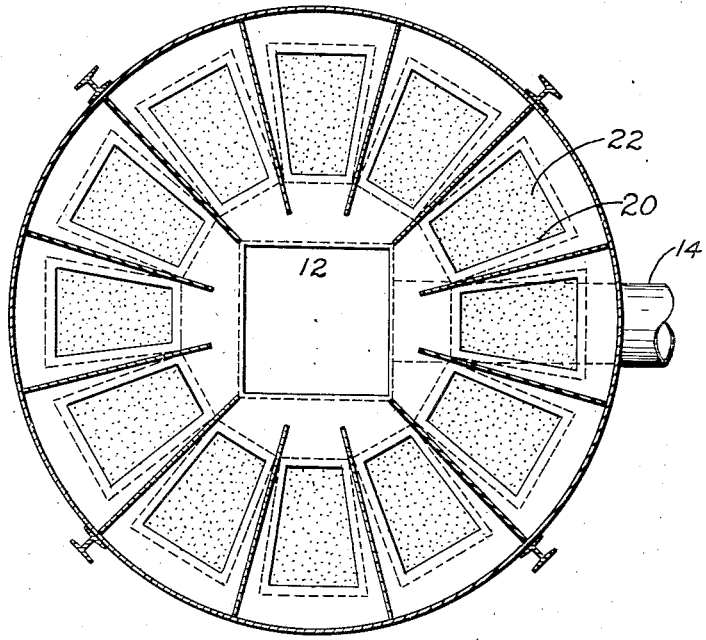
Figure 3 is a sectional view, taken along line 3—3 of Figure 1.

The lower inclined wall 19 of tank 1 is provided with a plurality of openings 20, arranged respectively directly beneath a confining member 6. At each side of the opening 20 is a vertical partition 21 extending inwardly from the outer periphery of tank 1 to a point near sump 12, as clearly shown in Figures 1 and 3. The vertical partitions 21, therefore, divide the space below partition 9 into a plurality of stalls, separating the mouth of each tubular member 6 from the adjacent tubular member, and similarly partially separating the mouth of each tubular member 7 from the next adjacent one.

Arranged in each of the stalls defined by vertical partitions 21 so as to cover the opening 20 in wall 19, is a foraminous member 22. The foraminous member 22 may advantageously be formed of lapideous material, such for example as filter stone, porous brick, porous porcelain, or similar material having sufficient strength to sustain the weight of a substantial head of cement above it, but being provided with a multiplicity of fine openings through which air or other gas may be forced from the exterior toward the interior, but which will not permit the ground cement to pass from the interior toward the exterior. A material especially adapted for this purpose is the so-called Polysius filter stone of commerce.

The foramious member 22 may be retained in position by a suitable frame 23, connected as by welding to the exterior of wall 19. A casing member 24 is arranged to extend over the exterior surface of foraminous member 22, in hermetically sealed relation thereto. The casing 24 is provided with a pipe 25 arranged to be connected to a suitable source of compressed air, or other cooling gas, not shown.

In order to maintain a constantly continuous column of cement in the confining members 4 and 5, the rate of withdrawal of the cooled cement from the sump 12 must be coordinated with the rate of feed of hot cement to the top of the apparatus. This co-ordination may be accomplished by maintaining the quantity of cement in the receiving chest portion of tank 1, above partition 3, at a substantially constant level. Any suitable arrangement for controlling the speed of motor 15 in accordance with the level of cement in the upper portion of tank 1 may be employed for this purpose, it being understood that if the level of cement in the upper portion of tank 1 tends continuously to become lower, the speed of motor 15 should be reduced; and vice versa. Suitable pressure means may be employed on the inside of tank 1 for so regulating the speed of motor 15 in accordance with the head of cement impressed on such pressure means, but in the embodiment shown, the level of cement in tank 1 is maintained within relatively narrow limits by the provision of a pair of agitators 26 and 27, driven respectively by small electric motors 28 and 29. It will be observed that the shaft of agitator 27 is substantially longer than the shaft of agitator 26, and an electric control circuit is provided so that the normal speed of motor 15 is such as to maintain the level of cement within tank 1 as shown, at a point such that a paddle of agitator 26 is above the level thereof, or free running; whereas the paddle of agitator 27 is submerged in the cement. With this arrangement of parts, motor 29 normally draws a larger current than motor 28, due to the differential in resistance to the turning of the respective agitators. When, however, an abnormal condition of operation is encountered, so that the paddle on agitator 26 becomes submerged, circuits are established which increase the speed of motor 15; and this condition prevails until the level of cement in tank 1 is reduced to a point such that agitator 26 is freed. Conversely, when the condition of operation is such that the level of cement in tank 1 is decreased to such an extent as to free agitator 27, circuits are established which reduce the speed of motor 15; and this condition prevails until the level of cement in tank 1 rises to an extent such as to again retard the rotation of agitator 27.

While it is obvious that by the provision of suitable watch glasses the speed of motor 15 may be manually controlled so as to properly co-ordinate the discharge of material with the feed thereof, and while it is obvious that a suitable arrangement of photo-electric cells may be substituted for such manual control, the wiring diagram shown in Figure 4 shows a typical circuit, whereby the speed of motor 15 may be controlled in accordance with the level of cement in tank 1, employing agitators 26 and 27 as the sensitive elements. While for the purpose of simple illustration a direct current control circuit is shown in Figure 4, those skilled in the art will readily understand the modifications and adaptations necessary for the employment of alternating current; and it is not to be understood that the present invention is limited to the particular control circuit diagrammatically shown in Figure 4.

In the circuit shown in Figure 4, the parts are in their normal position, where the level of the cement within tank 1 is, as shown in the drawings, between the paddles of agitators 26 and 27. Motor 15 is supplied with power through leads 30 and 31. Motors 28 and 29 are supplied with power through leads 32 and 33. In series with motor 28 is a relay 34, constructed and arranged so that when the motor is operating normally, and hence drawing a light current, the contact element 35 thereof is in its lower position as shown. When a load is imposed upon motor 28, however, as by submersion of the paddle of agitator 26 in cement, the heavier current drawn by motor 28 so energizes relay 34 as to move the contact element 35 thereof to its uppermost position. Similarly arranged in series with motor 29 is a relay 36, having a contact element 37 which under normal operating conditions is maintained in its uppermost position, as shown, due to the fact that when operating under normal conditions motor 29 draws a relatively heavier current; but when a condition of operation is encountered such that the operating current of motor 29 is reduced, as by freedom of agitator 27 from the cement within tank 1, the current through relay 36 is reduced to a point such that contact element 37 thereof falls to its lowermost position.

In order to vary the voltage impressed upon motor 15, a resistance 38 is provided in such circuit relation with the contact parts 35 and 37, so that when the apparatus is operating normally as shown, but half of the resistance 38 is in series with motor 15. When the current drawn by motor 28 exceeds normal, by virtue of agitator 26 having become submerged in the cement, contact element 35 moves to its uppermost position and cuts out all of resistance 38, thereby increasing the voltage impressed upon motor 15, and consequently increasing the speed thereof. When the current drawn by motor 29 is reduced, as by agitator 27 becoming free of the cement, contact element 37 of relay 36 falls to its lowermost position and effects a circuit through all of resistance 38, thereby reducing the voltage impressed upon motor 15, and consequently reducing the speed thereof.

In the process of cooling cement in accordance with the present invention, and using for the purpose of illustration the apparatus shown in the drawings, cement may be continuously fed from a grinding apparatus to tank 1 at a rate such, in coordination with the rate of removal thereof, that the level is maintained as shown in Figure 1 above the paddle of agitator 27, but below the paddle of agitator 26. The cement travels continuously downwardly, through confining members 4 and 5, in the form of a continuous column extending entirely across the confining members, and thereby forming a continuous curtain across the confining members. Concurrently, compressed air or other cooling gas is introduced through pipe 25 and foraminous member 22 and delivered on the interior of wall 19 in the form of a multiplicity of fine jets, directed continuously upwardly. The stream of cooling gas progresses upwardly in counter-current relation to the flow of cement through the confining members, and being widely dispersed, continuously agitates the particles of cement and contacts the various surfaces thereof, moving progressively different particles into contact with the side walls of cooling elements 4.

In order to insure that the stream of compressed gas will travel upwardly, it will be understood that a pressure differential is maintained between the top and bottom of tank 1. For example, the top of tank 1 may be vented to the atmosphere, and the compressed gas being introduced at the bottom of the tank will seek the zone of lower pressures. Leakage of the compressed gas through the discharge is inhibited in any suitable manner, but in the embodiment shown, where a screw conveyor is employed, it will be understood that the conveyor itself exerts sufficient restraint upon the movement of cement therethrough under pressure per se that the device is effectually sealed.

Additional cooling is effected by the circulation of water about the exteriors of confining members 4 and 5, absorbing heat from the latter, and thereby maintaining a temperature differential between the walls of members 4 and 5 of the cement passing through the same.

The extent of cooling accomplishable by the process and apparatus of the present invention depends upon many factors, including the character of the product being treated, the fineness to which it is ground, the temperature before treatment, the rate of feed, and the cooling area of the device, the rate of circulation and temperature of the water, and the rate of circulation and temperature of the air; for example, employing a single tube having an internal diameter of one foot and a length of twenty feet as the confining member, preliminarily ground cement (having a surface area of 2060 square centimeters per gram), was fed at the rate of 8.6 barrels per hour, having an initial temperature of 240° F. Water (at room temperature) was circulated about the confining member at the rate of 4.9 cubic feet per barrel of cement, and air (at room temperature) was forced through the confining member in counter-current relation to the flow of cement at the rate of 3.7 cubic feet per minute per barrel of cement per hour. This resulted in an 82° F. reduction of the temperature of the cement. When, however, the rate of feed of the same cement was increased to 12.1 barrels per hour, the rate of water circulated increased to 5.2 cubic feet per barrel, and the rate of air circulation reduced to 2.4 cubic feet per minute per barrel per hour, the reduction of the temperature of the cement was 69° F.

Employing the same apparatus with a finished cement of high early strength fineness (having a surface area of 2,450 square centimeters per gram) the cement was fed at the rate of 9 barrels per hour, water was circulated at the rate of 6.4 cubic feet per barrel, and air was introduced at the rate of 3.6 cubic feet per minute per barrel per hour. The temperature of the initial cement was reduced 54° F. from 199° F. In another example, however, in which the cement was fed at the rate of 12.9 barrels per hour, the water at the rate of 4.5 cubic feet per barrel, and air at the rate of 2.5 cubic feet per minute per barrel per hour, the temperature was reduced 46° F. from 196° F.

While the invention has been disclosed with particular relation to the cooling of Portland cement, and while the invention is peculiarly adapted to the handling of cement, it is to be understood that reference herein made to cement is merely illustrative of and not limitative upon the field of use of the invention. Obviously the process and apparatus disclosed may be employed for cooling (or heating) other pulverulent materials with results comparable to those indicated hereinbefore.

From the foregoing description it should be apparent that the present invention accomplishes its objects, and provides a process and apparatus whereby cement, either preliminarily ground or finish ground, may be efficiently, effectually, and economically cooled to the extent necessary for commercial operations; and that the actual cooling of the cement is accomplished by the action of both gas and water, without the necessity of employing moving parts. While a full disclosure of the process and apparatus has been given, it is not to be understood that the invention is limited to the particular apparatus hereinbefore described and shown in the accompanying drawings, but that such apparatus is representative of but one embodiment, though deemed sufficient for a disclosure of the invention. It is obvious that many modifications, re-arrangements and adaptations of the parts will present themselves to those skilled in the art, without departing from the spirit of this invention; and it is therefore to be distinctly understood that such modifications, and the use of such individual features and combinations of features as do not depart from the spirit of this invention, are, although not specifically described herein, contemplated by and within the scope of the appended claims.

Having thus described the invention, what is claimed is:

1. Apparatus for cooling cement, or the like, comprising, in combination, a chest arranged to contain a substantial quantity of cement, a tube extending downwardly from said chest, means for withdrawing cement at the bottom of said tube, and a foraminous stone arranged adjacent the bottom of said tube for admitting gas but confining cement, said stone being arranged with reference to the tube so that gas admitted by the stone travels upwardly through the tube, means for supplying gas under pressure to the exterior of the foraminous stone, and means for confining the escape path of gas issuing through the stones to said tube.

2. Apparatus for cooling cement, or the like, comprising, in combination, a chest for containing a quantity of cement, a plurality of separate tubes depending from said chest and receiving cement therefrom, a header beneath said tubes, a series of foraminous stones arranged in said header and disposed respectively beneath the lower termini of said tubes, and means for circulating gas through said stones and into the cement.

3. Apparatus for cooling cement, or the like, comprising, in combination, a chest arranged to contain a substantial quantity of cement, a tube extending downwardly from the bottom of said chest and adapted to receive cement moving downwardly through the chest, means for withdrawing cement below the bottom of said tube said withdrawing means being of a character such as to constitute a seal against the blow-out of cooling gas therethrough, means responsive to the quantity of cement in said chest for regulating the rate of discharge through said withdrawing means, and nebulizing means for introducing cooling gas below the bottom of said tube, said nebulizing means being connected to confine the escape path of the gas to said tube.

4. Apparatus for cooling cement, or the like, comprising, in combination, a chest arranged to contain a substantial quantity of cement, a plurality of parallel tubes extending downwardly from the bottom of said chest and adapted to receive cement moving downwardly through the chest, a header embracing the lower termini of said tubes, means for withdrawing cement from the header, means responsive to the quantity of cement in said chest for regulating the rate of discharge through the said withdrawing means, and a plurality of nebulizing devices arranged in said header for introducing cooling gas into the header and to said tubes.

RICHARD G. UHLIG.